Feb. 18, 1930. B. S. T. BISHOP ET AL 1,747,418
SPINDLE FEED FOR TAPPING MACHINES
Filed Dec. 7, 1928 2 Sheets-Sheet 1
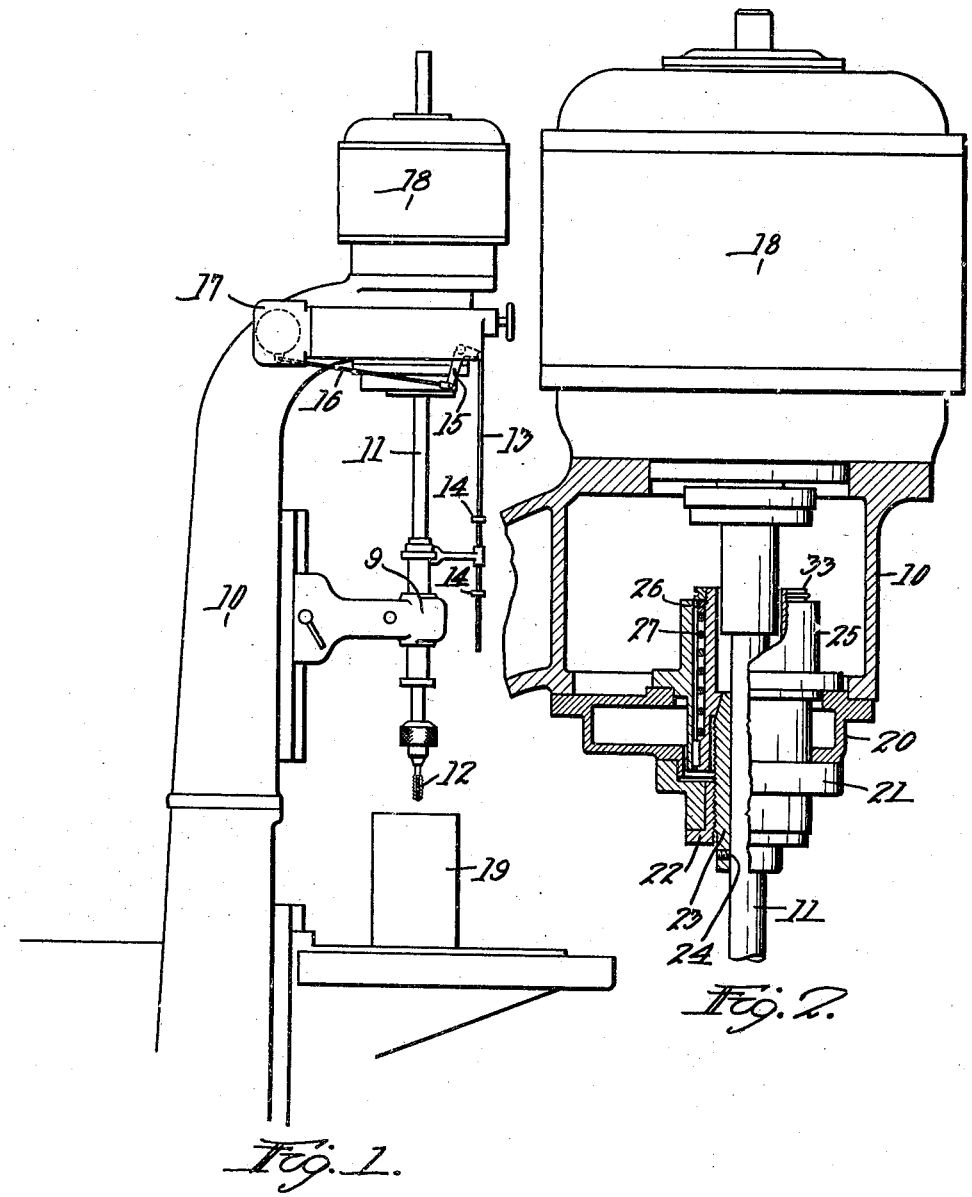

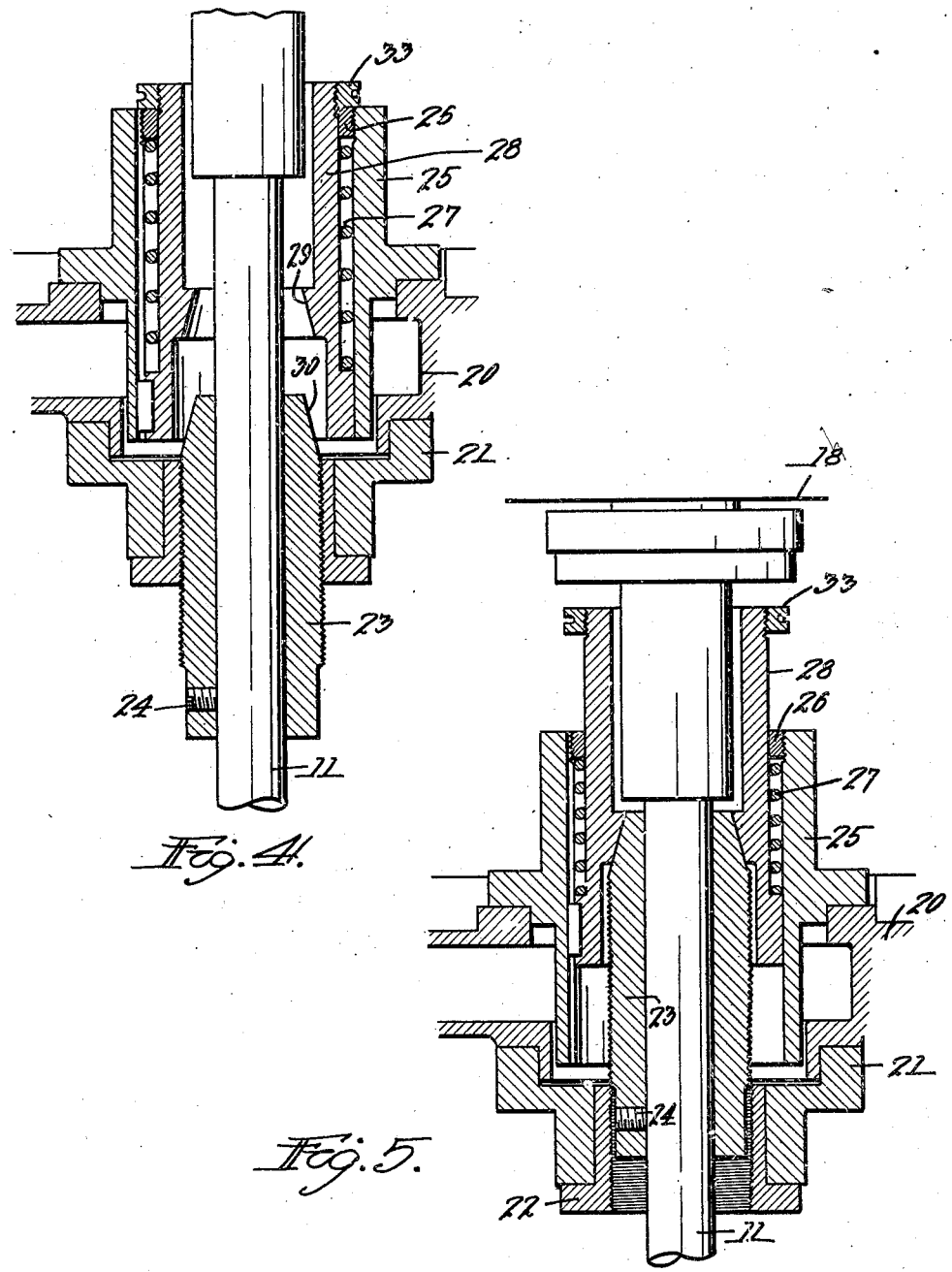

Patented Feb. 18, 1930

1,747,418

UNITED STATES PATENT OFFICE

BENJAMIN S. T. BISHOP, OF SHREWSBURY, AND HENRY A. JACOBSON, OF WORCESTER, MASSACHUSETTS, ASSIGNORS TO LELAND-GIFFORD COMPANY, A CORPORATION OF MASSACHUSETTS

SPINDLE FEED FOR TAPPING MACHINES

Application filed December 7, 1928. Serial No. 324,408.

The principal objects of this invention are to provide a tapping machine having a positive feed for the tap, or a so-called leadscrew feed, located directly on the tapping spindle; to provide the same with a brake for stopping the spindle from rotating when it has withdrawn and risen to a predetermined height; to provide means whereby in case the brake does not work and the screw for controlling the feed continues to travel, it can go only a limited distance and it will be impossible for it to injure the machine, and to simplify this type of tapping machine.

Other objects and advantages of the invention will appear hereinafter.

Reference is to be had to the accompanying drawings in which

Fig. 1 is a side view of a tapping machine embodying the features of this invention;

Fig. 2 is a sectional view of the feeding screw and associated parts;

Fig. 3 is a rear side view of the reversing switch of the feed control;

Fig. 4 is a sectional view of the lead screw feed showing the brake mechanism, and Fig. 5 is a similar view showing the operation if the brake mechanism does not act.

It has been proposed heretofore to provide a positive feed for a tap in a tapping machine but such devices have been unnecessarily complicated by the fact that such feeds have been located on other shafts than the tap spindle. It has also been possible for the screw to turn too far on account of its inertia when stopped by the usual stopping device when feeding out and it has been possible for it to feed too far and bring the head of the screw into contact with the driving quill, thus injuring the same.

We have shown the invention as applied to a tapping machine frame 10, having a spindle 11 on which a tap 12 is fixed in any usual way. The usual adjustable bearing and guide 9 for the spindle is shown and a stopping rod 13 having on it the stops 14. In this case the rod is shown as connected by a lever 15 with the link 16 which turns the switch 17 from neutral position as shown in Fig. 3, in either direction, to reverse the feed of the tap. The spindle of the tap is direct connected with the motor 18, in the preferred form of the machine, which this reversing switch controls.

The frame 10 of the machine carries a plate 20 in fixed position which is provided with a collar 21 having a bushing 22, all positively fixed in position. This bushing is screw-threaded inside and constitutes a nut. In it runs a feed screw 23 which is fixed positively, in adjusted position, by a set screw 24 to the spindle 11. This feed screw is provided with the same number of threads per inch as the tap so that the spindle 11 must feed the tap positively in exactly the correct manner into the work and start it without injuring the work or the tap during the making of the first turn. This insures that all tapped holes will be tapped just alike clear to the end. The bushing 22 and screw 23 are replaceable by others of different pitch to accommodate different taps.

On the plate 20 is mounted a vertical cylinder 25 which is hollow to receive the parts inside and is closed at the top by a nut 26 having an external thread. Under this nut is a spring 27 holding down a non-rotatable slide 28 which is provided with a conical surface 29 adapted to be engaged by the conical surface 30 at the end of the screw 23 and constitute a brake therefor. This brake is desirable because of the tendency of the tap, the spindle, and the armature in the motor to continue to rotate when stopped by the upper stop 14 when it comes up out of the work 19. At the top of the member 28 is a nut 33 which holds it in its downward motion as shown in Fig. 4.

On account of these two conical surfaces coming together at that time they constitute a friction braking surface which will, under ordinary circumstances, stop the spindle immediately. A safety means is provided, however, to prevent the screw 23 from moving upwardly far enough to engage the parts above it. This simply consists of limiting the number of screw threads so that when the screw 23 turns up all the way out of the bushing 22 as shown in Fig. 5, it will simply turn in that position. The spring 27 will yield to allow it to move to that position if the conical braking surfaces do not previously stop its rotation, but the friction increases as it moves out, so that in the ordinary operation of the device it will stop at once without moving up into the position shown in Fig. 5. That is only an emergency position.

This device constitutes a very simple means for providing a positive or lead screw feed for a tap located directly on the spindle thereof and also provides the safety means necessary to prevent injury to the machine by the motion of the tap after it comes out of the work.

Although we have illustrated and described only one form of the invention we are aware of the fact that modifications can be made therein by any person skilled in the art without departing from the scope of the invention as expressed in the claims. Therefore, we do not wish to be limited in this respect but what we do claim is:—

1. In a tapping machine, the combination with the spindle for carrying the tap, of a nut mounted in fixed position and a screw fixed to the spindle and operating in the nut for feeding the tap positively into the work, said screw having a conical upper end, and a member slidably mounted with respect to the frame and having a conical surface for receiving said conical end to stop the rotation of the spindle automatically at the time when the tap comes up out of the work.

2. In a tapping machine, the combination with the tap spindle, of a screw fixed thereon, the threads of the screw having the same pitch as the threads of the tap, a screw-threaded member for receiving the screw and thereby feeding the tap both in and out positively in accordance with the screw threads, a fixed hollow member above said screw, a non-rotatable member located therein and having a surface for engaging the rear surface of the screw and applying friction to stop the spindle when the tap is drawn out of the work, the latter named member being slidably mounted, and a spring for normally holding it down with a yielding resistance.

3. In a tapping machine, the combination with the tap spindle, of a screw fixed in adjusted position thereon and removable and replaceable, the threads of the screw having the same pitch as the threads of the tap, a screw-threaded member for receiving the screw, a non-rotatable member having a surface for engaging the top surface of the screw and applying friction to stop the spindle when the tap is drawn out of the work, the latter named member being slidably mounted, a spring for normally holding it down with a yielding resistance, said screw and threaded member in which it is located terminating in such a position that when the spindle is raised a certain distance the screw will simply turn on the top of its threaded member without moving upward any further.

In testimony whereof we have hereunto affixed our signatures.

BENJAMIN S. T. BISHOP.
HENRY A. JACOBSON.